(12) United States Patent
Clymer et al.

(10) Patent No.: US 10,924,443 B1
(45) Date of Patent: Feb. 16, 2021

(54) ELECTRONIC MESSAGING SYSTEM AND COMMUNICATION DEVICE THAT MONITORS ITS POSITION

(71) Applicant: Scout Brands LLC, Dover, DE (US)

(72) Inventors: Eric Clymer, Austin, TX (US); Roger Green, West Hollywood, CA (US); Scott Wiskus, Austin, TX (US); Brian Zager, Los Angeles, CA (US); John Johnson, Austin, TX (US); Evan Prothro, Flint, TX (US)

(73) Assignee: Scout Brands LLC, Dover, DE (US)

( * ) Notice: Subject to any disclaimer, the term of this patent is extended or adjusted under 35 U.S.C. 154(b) by 296 days.

(21) Appl. No.: 14/941,523

(22) Filed: Nov. 13, 2015

Related U.S. Application Data

(60) Provisional application No. 62/079,663, filed on Nov. 14, 2014, provisional application No. 62/091,067, filed on Dec. 12, 2014.

(51) Int. Cl.
*G06F 15/16* (2006.01)
*H04L 12/58* (2006.01)
*H04L 29/08* (2006.01)

(52) U.S. Cl.
CPC ............ *H04L 51/20* (2013.01); *H04L 67/306* (2013.01)

(58) Field of Classification Search
CPC ......... H04L 51/12; H04L 51/14; H04L 51/32; H04L 12/585; H04L 12/58; H04L 12/581; H04L 12/5855; H04L 29/08072; H04L 29/06; H04L 69/329; H04L 67/06; G06Q 10/107; G06Q 50/01; G06F 8/65
USPC ................................................. 709/206–207
See application file for complete search history.

(56) References Cited

U.S. PATENT DOCUMENTS

| | | | |
|---|---|---|---|
| 7,895,277 B2 | 2/2011 | Drory et al. | |
| 9,059,957 B2 | 6/2015 | Van Os et al. | |
| 2003/0033324 A1* | 2/2003 | Golding | G06F 17/3064 |
| 2006/0085505 A1* | 4/2006 | Gillum | G06Q 10/107 709/206 |
| 2008/0147501 A1 | 6/2008 | Gilliam | |
| 2008/0235336 A1* | 9/2008 | Stern | G06Q 10/107 709/206 |
| 2008/0263168 A1* | 10/2008 | Ishii | G06Q 10/107 709/206 |
| 2008/0268895 A1* | 10/2008 | Foxenland | G01C 21/20 455/550.1 |

(Continued)

*Primary Examiner* — Abdullahi E Salad
(74) *Attorney, Agent, or Firm* — Mallory M. Henninger; Advent, LLP

(57) ABSTRACT

An electronic messaging system includes a memory operable to store one or more modules and a processor operably coupled to the memory. The processor is operable to execute the one or more modules to receive an electronic message package that includes a message from a sender associated with a first communication device, an indication of an intended recipient, a condition for when the message is to be viewable by the intended recipient, and a teaser that can be immediately viewable by the at least one intended recipient. The processor is also operable to execute the one or more modules to initiate delivery of the message at a second communication device associated with the intended recipient so that the message is viewable by the intended recipient only when the condition has been met while the teaser is immediately viewable by the at least one intended recipient.

16 Claims, 7 Drawing Sheets

(56) References Cited

U.S. PATENT DOCUMENTS

| | | | |
|---|---|---|---|
| 2008/0313294 A1* | 12/2008 | Malone | G06Q 10/107 709/206 |
| 2009/0298480 A1* | 12/2009 | Khambete | G06F 17/30699 455/414.1 |
| 2009/0327719 A1* | 12/2009 | Herley | G06F 21/42 713/168 |
| 2010/0180289 A1* | 7/2010 | Barsook | G06Q 30/02 725/29 |
| 2011/0113320 A1* | 5/2011 | Neff | G06Q 10/10 715/230 |
| 2011/0313874 A1* | 12/2011 | Hardie | H04W 4/02 705/26.1 |
| 2012/0102326 A1* | 4/2012 | Palekar | G06F 21/604 713/168 |
| 2013/0086178 A1* | 4/2013 | Osborne | G06Q 30/00 709/206 |
| 2013/0246535 A1 | 9/2013 | Yadava et al. | |
| 2014/0316920 A1* | 10/2014 | Wolfe | G06Q 20/12 705/26.1 |
| 2015/0089231 A1* | 3/2015 | Oxford | H04L 9/0869 713/171 |
| 2015/0348082 A1* | 12/2015 | Zecarias | H04L 51/18 705/14.27 |
| 2016/0014054 A1 | 1/2016 | Plotkin | |

* cited by examiner

US 10,924,443 B1

ELECTRONIC MESSAGING SYSTEM AND COMMUNICATION DEVICE THAT MONITORS ITS POSITION

CROSS-REFERENCE TO RELATED APPLICATIONS

The present application claims the benefit under 35 U.S.C. § 119(e) of U.S. Provisional Application Ser. No. 62/079,663, filed Nov. 14, 2014, and titled "MAKING A MESSAGE VIEWABLE BY AN INTENDED RECIPIENT ONLY WHEN ONE OR MORE CONDITIONS HAVE BEEN MET," and 62/091,067, filed Dec. 12, 2014, and titled "MAKING A MESSAGE VIEWABLE BY AN INTENDED RECIPIENT ONLY WHEN ONE OR MORE CONDITIONS HAVE BEEN MET," which are herein incorporated by reference in their entirety.

BACKGROUND

Electronic messaging can refer to sending a message between electronic communication devices. Electronic messages include, but are not necessarily limited to: instant messages (e.g., sent using a computer network); personal messages (e.g., sent using a computer network); text messages (e.g., sent using a cellular telephone network); electronic mail messages (e.g., sent using a computer network); voicemail messages, fax message, and pager messages (e.g., sent using a public switched telephone network); and so on.

SUMMARY

An electronic messaging system includes a memory operable to store one or more modules and a processor operably coupled to the memory. The processor is operable to execute the one or more modules to receive an electronic message package that includes a message from a sender associated with a first communication device, an indication of an intended recipient, a condition for when the message is to be viewable by the intended recipient, and a teaser that can be immediately viewable by the at least one intended recipient. The processor is also operable to execute the one or more modules to initiate delivery of the message at a second communication device associated with the intended recipient so that the message is viewable by the intended recipient only when the condition has been met while the teaser is immediately viewable by the at least one intended recipient.

A computer-implemented method for managing a temporary account created for an intended recipient for a message includes receiving a message from a first communication device and an indication of at least one intended recipient, where the indication includes a telephone number associated with the intended recipient. The computer-implemented method also includes initiating storage of the message in a temporary account associated with the telephone number. The computer-implemented method further includes receiving a request to create a new account for the intended recipient, where the telephone number associated with the intended recipient is received with the request. The message is transferred from the temporary account associated with the telephone number to the new account associated with the intended recipient.

A computer-implemented method for operating a device to monitor its position using a navigation system includes receiving a location of the device, and determining when the device is moving at a rate of speed greater than a predetermined speed threshold by comparing the location to a previous location for the device. When the rate of speed is greater than the speed threshold, polling by the navigation system is enabled. When the rate of speed is not greater than the speed threshold, polling by the navigation system is disabled and the navigation system is enabled. When the navigation system is enabled, and the device has moved a distance greater than a predetermined movement threshold, a determination is made as to whether the device has arrived at a desired location or is moving.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Figure 1:
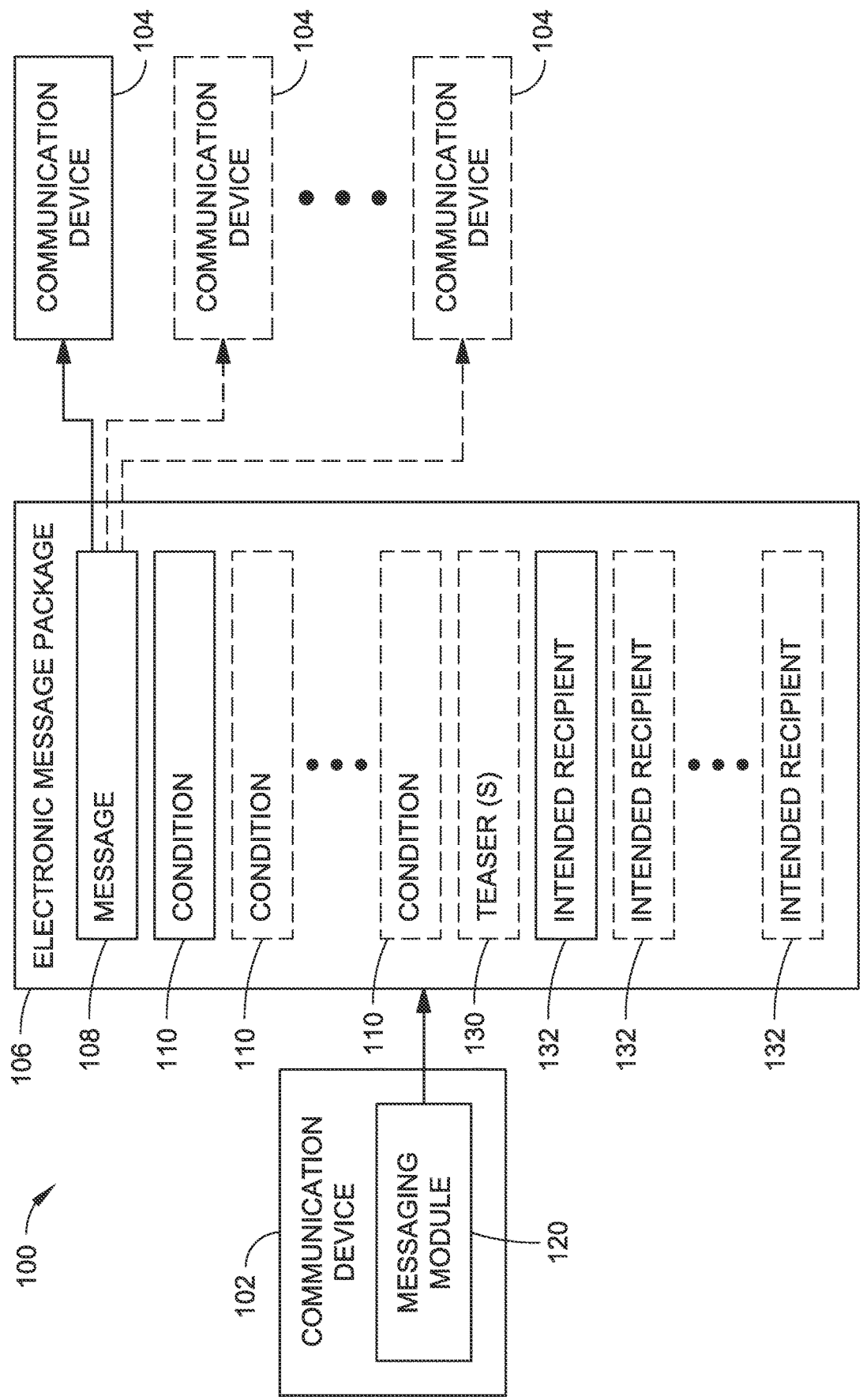
FIG. 1 is a block diagram illustrating an electronic messaging system in accordance with example embodiments of the present disclosure.
Figure 2:
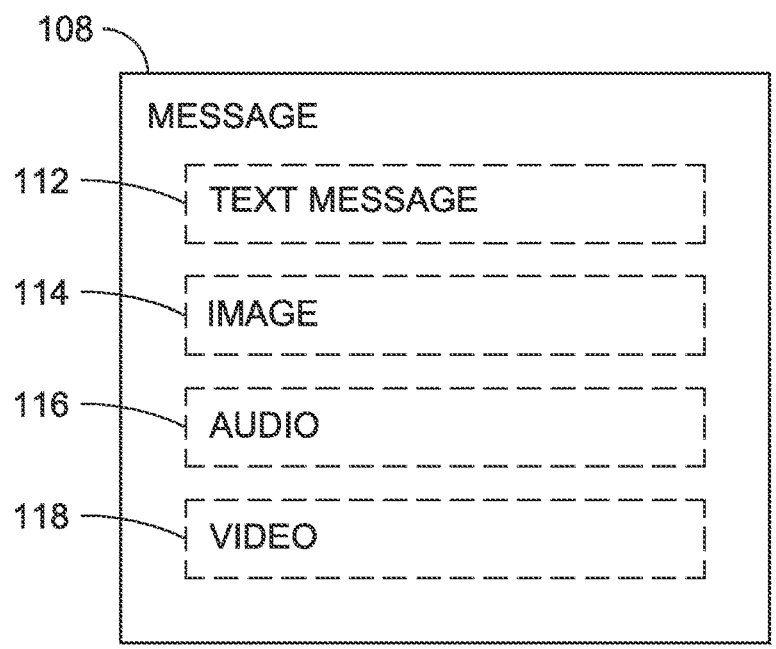
FIG. 2 is a block diagram illustrating a message for an electronic messaging system, such as the electronic messaging system illustrated in FIG. 1, in accordance with example embodiments of the present disclosure.
Figure 3:
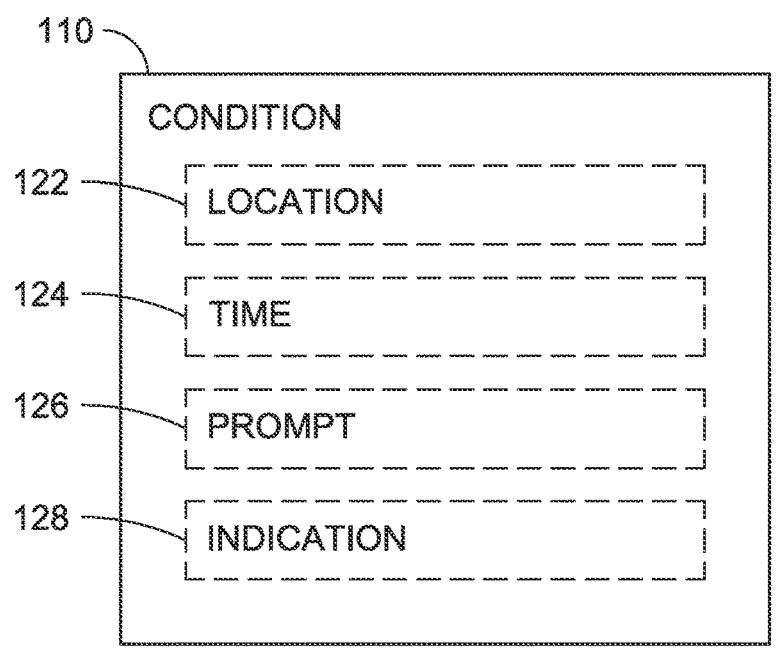
FIG. 3 is a block diagram illustrating a condition when a message, such as the message illustrated in FIG. 2, is to be viewable by an intended recipient or recipients in an electronic messaging system, such as the electronic messaging system illustrated in FIG. 1, in accordance with example embodiments of the present disclosure.
Figure 4:
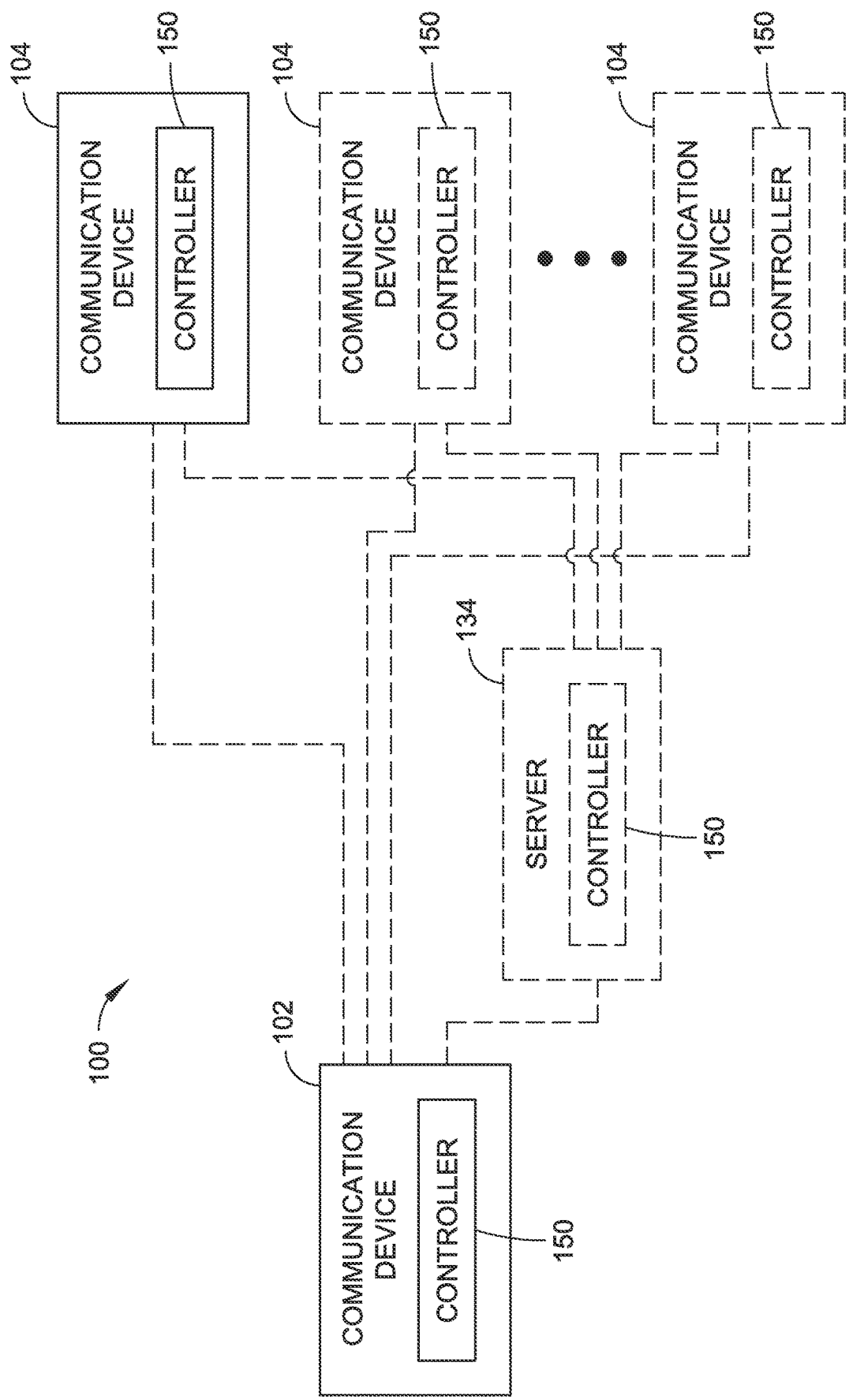
FIG. 4 is another block diagram illustrating an electronic messaging system in accordance with example embodiments of the present disclosure.

Referring generally to FIGS. 1 through 5, an electronic messaging system 100 is described in accordance with example embodiments of the present disclosure. The system 100 includes a first communication device 102 (e.g., a mobile phone) communicatively coupled with a second communication device 104 (e.g., another mobile phone). The communication device 102 is configured to transmit an electronic message package 106 that includes a message 108 from a sender associated with the communication device 102. The message 108 is intended to be viewed by a recipient associated with the communication device 104 or multiple recipients (e.g., associated with a number of communication devices 104). The electronic message package 106 also includes one or more conditions 110 for when the message 108 is to be viewable by an intended recipient or recipients. The communication device 104 is configured to receive the message 108 of the electronic message package 106 so that the message 108 is viewable by an intended recipient only when one or more of the conditions 110 has been met.

In some embodiments, the message 108 and/or conditions 110 can be kept secret from one or more intended recipients. For example, the intended recipient may not be aware of the content of a message and/or a condition or conditions under which the message may be made viewable to an intended recipient. In other embodiments, the message 108 can include content that may be immediately viewable by the intended recipient, such as a thumbnail image, teaser text, and so forth. For instance, an application can present a list of pending messages 108 that are not yet viewable (e.g., displayed in a graphical list including thumbnails and/or teaser text). The application can also present a list of available messages 108, previously viewed messages 108, and so forth. Further, the application can allow an intended recipient or a group of intended recipients to comment on one or more delivered and/or pending messages 108 (e.g., before a message is viewable, after a message is viewable, and so on).

In some embodiments, the message 108 comprises text. For example, the message 108 can comprise a text message 112, such as a short messaging service (SMS) text message. However, a text message is provided by way of example and is not meant to limit the present disclosure. In other embodiments, the message 108 can comprise other content, including, but not necessarily limited to: an image 114, multiple images 114 (e.g., a slideshow), audio 116, video 118, and/or various combinations of text, images, audio, video, and so forth. For example, in some embodiments, the message 108 comprises a multimedia message, such as a multimedia messaging service (MMS) multimedia message. It should also be noted that the message 108 can be formatted for delivery using a variety of messaging protocols and/or formats. For example, while text messages and/or multimedia messages are described herein with some specificity, a message 108 can also comprise an electronic mail message (e-mail, email), a voice-mail message, an instant message, a fax message, a pager message, and so forth.

In embodiments of the disclosure, the communication device 102 and/or the communication device 104 comprise client devices having electronic messaging functionality. For example, in some embodiments, a communication device comprises a mobile telephone device (e.g., a cellular telephone or a smartphone) that can make and receive telephone calls over a radio link while the mobile telephone device is moved around a wide geographic area. However, mobile telephone devices are provided by way of example and are not meant to limit the present disclosure. In other embodiments, the communication device 102 and/or the communication device 104 can comprise other communication equipment, including, but not necessarily limited to: mobile computing devices (e.g., hand-held portable computers, personal digital assistants (PDAs), laptop computers, netbook computers, tablet computers, and so forth), devices that include functionalities associated with smartphones and tablet computers (e.g., phablets), portable game devices, portable media player devices, multimedia devices, satellite navigation devices (e.g., global positioning system (GPS) navigation devices), e-book reader devices (eReaders), smart television (TV) devices, personal computer (PC) devices, watches (e.g., smart watches), other devices that provide electronic messaging functionality, and so on. In embodiments of the disclosure, one or more communication devices 102 can be associated with a sender, and one or more communication devices 104 can be associated with an intended recipient or recipients. Senders and intended recipients can communicate with the system 100 via these client devices.

The communication device 102 can include a messaging module 120 that provides functionality for receiving and transmitting a message 108 for an intended recipient or recipients so that the message 108 is viewable by an intended recipient only when one or more of the conditions 110 have been met. For example, the messaging module 120 can be used by the sender to compose a message 108 and specify one or more conditions 110 for when the message 108 is to be viewable by an intended recipient or recipients. In embodiments of the disclosure, the messaging module 120 can be configured as a program of instructions downloadable to the communication device 102 (e.g., in the form of a software application or "app").

In some embodiments, a system 100 provides on demand software, e.g., in the manner of software as a service (SaaS) distributed to a communication device 102 via a network (e.g., the Internet). For example, a system 100 hosts messaging software and associated data in the cloud. The software is accessed by the communication device 102 with a thin client (e.g., via a web browser). A sender interfaces with the software (e.g., a web page) provided by the system 100 via a user interface (e.g., using a web browser). In embodiments of the disclosure, the system 100 communicates with a communication device 102 using an application protocol, such as hypertext transfer protocol (HTTP). In some embodiments, the system 100 provides a communication device 102 with a user interface accessed using a web browser and displayed on a monitor and/or a mobile device. Web browser form input can be provided using a hypertext markup language (HTML) and/or extensible HTML (XHTML) format, and can provide navigation to other web pages (e.g., via hypertext links). The web browser can also use other resources such as style sheets, scripts, images, and so forth.

In other embodiments, content is served to a communication device 102 using another application protocol. For instance, a third-party tool provider (e.g., a tool provider not operated and/or maintained by a system 100) can include content from a system 100 (e.g., embedded in a web page provided by the third-party tool provider). It should be noted that a thin client configuration for the communication device 102 is provided by way of example and is not meant to limit the present disclosure. In other embodiments, the communication device 102 is implemented as a thicker (e.g., fat, heavy, rich) client. For example, the communication device 102 provides rich functionality independently of the system 100. In some embodiments, one or more cryptographic protocols are used to transmit information within a system 100 and/or between a communication device 102 and a third-party tool provider. Examples of such cryptographic protocols include, but are not necessarily limited to: a transport layer security (TLS) protocol, a secure sockets layer (SSL) protocol, and so forth. For instance, communications between a system 100 and a communication device 102 can use HTTP secure (HTTPS) protocol, where HTTP protocol is layered on SSL and/or TLS protocol.

In some embodiments, the sender uses the messaging module 120 to specify a condition 110 comprising a location 122 or locations 122 where an intended recipient is to be for a message 108 to be viewable by the intended recipient. For example, the sender searches for a named location and/or an address using a mapping application programming interface (API). The sender then selects the named location and/or address (e.g., from a list of possibilities). However, a list of possible named locations and/or addresses is provided by way of example and is not meant to limit the present disclosure. In other embodiments, the sender can use a mapping API to graphically select one or more coordinate locations. For example, the sender can place indicia (e.g., a graphical icon, such as a pin) at a particular position on a map provided by the messaging module 120, where the position of the indicia placed on the map corresponds to a particular location and/or geographic region (e.g., a named location, an unnamed location, a portion of a named location, such as a particular location within a city park, and so on). Further, in some embodiments, the sender can specify a geographic region. For example, the sender can define a shape (e.g., an ellipse, a circle, a rectangle, a square, an irregular shape, etc.) using multiple positions on a map to specify a geographic region (e.g., a geofence) where an intended recipient is to be for a message 108 to be viewable by the intended recipient. In some embodiments, the sender can also provide one or more descriptions associated with a location 122. For instance, when the sender places indicia on a map, the sender can also enter a description for an intended recipient (e.g., "North side of the park").

The messaging module 120 can then provide the specified location 122 or locations 122 as one or more of the conditions 110 included with the electronic message package 106. For example, one or more of conditions 110 can include a coordinate location defined by latitude and longitude. In other embodiments, one or more conditions 110 can include a geographic region defined by a shape (e.g., a rectangle) described by multiple latitude and longitude coordinate locations. In further embodiments, one or more conditions 110 can include a coordinate location defined by latitude and longitude, with an associated radius extending outwardly from the coordinate location. In other embodiments, one or more conditions 110 can include an irregularly-shaped geographic region (e.g., a geofence) defined by multiple coordinate locations, and so forth. However, it should be noted that conditions described by one or more latitude and longitude coordinate locations are provided by way of example and are not meant to limit the present disclosure. In other embodiments, one or more of the conditions 110 included with the electronic message package 106 can comprise relative positions for an intended recipient, such as a proximity of a location, a direction of a location, and so forth, which can be described with relation to another location, such as the location of a sender, the location of an intended recipient, and so forth.

In some embodiments, the sender uses the messaging module 120 to specify a condition 110 comprising a time 124 or times 124 (e.g., a future time or times) when a message 108 is to be viewable by an intended recipient or recipients. For example, the sender searches for a date, a time, a time and date, etc. using a calendar API. The sender then selects a time or times (e.g., from a list of possibilities). In some embodiments, times can be specified with respect to the sender's time zone. In other embodiments, times can be specified with respect to an intended recipient's time zone. However, specific dates, times, times and dates, and so forth are provided by way of example and are not meant to limit the present disclosure. In other embodiments, the sender can specify times comprising a time interval when a message 108 is to be viewable by an intended recipient or recipients.

In some embodiments, the sender can specify a time interval, including, but not necessarily limited to: a time of day (e.g., morning, afternoon, evening), an occasion (e.g., a birthday), a holiday (e.g., a national holiday), a season (e.g., spring, summer, fall, winter, etc.), and so on. Further, the sender can specify a countdown time (e.g., an amount of time from when a message is sent, received, etc. to when the message is to be viewable by an intended recipient).

The messaging module 120 can then provide the specified time 124 or times 124 as one or more of the conditions 110 included with the electronic message package 106. For example, one or more conditions 110 can include a time defined by a specific time and date. In other embodiments, one or more conditions 110 can include times defined by a specific time interval (e.g., a starting time and date and/or an ending time and date, a countdown time, etc.). In further embodiments, one or more conditions 110 can include a time defined by a time of day, an occasion, a holiday, and so on, which can be converted to one or more specific time intervals (e.g., one or more intervals defined by a starting time and date and an ending time and date). Further, in some embodiments, a time 124 or times 124 can be provided with respect to a sender's time zone, an intended recipient's time zone, a standardized time system (e.g., Greenwich Mean Time (GMT)), and so on. However, it should be noted that while specified location 122 or locations 122 and specified time 124 or times 124 have been described as triggering events with some specificity, these triggering events are provided by way of example and are not meant to limit the present disclosure. In other embodiments, one or more of the conditions 110 included with the electronic message package 106 can comprise another triggering event, such as a temperature, an indication of the end of an event (e.g., the end of a sporting event), a physical achievement for the sender and/or an intended recipient, and so forth.

In embodiments of the disclosure, information regarding such triggering events can be provided using an API, deep linking (e.g., linking to a specific location within a mobile application), and so forth. Further, in some embodiments, functionality can be provided (e.g., on a sender's communication device 102) to alert a sender to send an electronic message package 106. For instance, a calendar API can alert a sender to send an electronic message package 106 in anticipation of a calendar event associated with an intended recipient (e.g., an intended recipient's birthday). In some embodiments, the communication device 102 can obtain information regarding an event using a calendar API resident on the communication device 102, which can include information from the sender's calendar, an intended recipient's calendar, a publicly available calendar, and so forth. For example, an intended recipient can provide information regarding an event to a calendar application resident on the communication device 104, which can then provide the information to the communication device 102 (e.g., as a recipient-generated time).

In some embodiments, the sender uses the messaging module 120 to specify a condition 110 comprising one or more prompts 126 to be answered by an intended recipient or recipients to make a message 108 viewable by an intended recipient. For example, the sender enters a text phrase to prompt an intended recipient to complete one or more tasks to make a message 108 viewable. For instance, the sender enters a question such as "Have you seen the movie yet?" The sender can also specify one or more acceptable and/or unacceptable answers to a prompt (e.g., "yes" or "no" answers) that indicate when a message 108 is to be viewable by an intended recipient. For example, in the case of a question such as "Have you seen the movie yet?" the sender can specify that a message 108 is to be viewable by an intended recipient only when the answer to a prompt 126 is "yes." However, in another example, the sender enters a question such as "Have you been to the store yet?" and specifies that the message 108 is to be viewable by an intended recipient only when the answer to a prompt 126 is "no." It should be noted that "yes" and "no" answers are provided by way of example and are not meant to limit the present disclosure. In other embodiments, an answer to a prompt 126 to make a message 108 viewable can be another answer, including, but not necessarily limited to: a name (e.g., a legal name, a nickname), a date (e.g., a day, a month, a year, a decade), a place (e.g., a named location, an address, a street name), a time, a numerical value, and so on.

The messaging module 120 can then provide the specified prompt 126 or prompts 126 (and possibly one or more acceptable and/or unacceptable answers to specified prompts 126) as one or more of the conditions 110 included with the electronic message package 106. For example, one or more conditions 110 can include a text phrase and one or more associated answers to make a message 108 viewable by an intended recipient or recipients. In other embodiments, one or more conditions 110 can include a series of prompts 126, where an acceptable answer to any one of the prompts 126 can make a message 108 viewable by an intended recipient or recipients. In further embodiments, one or more conditions 110 can include a series of prompts 126, where all prompts 126 or a subset of prompts 126 are to be answered acceptably to make the message 108 viewable by an intended recipient or recipients. As described herein, possible answers to a prompt 126 can be in the form of acceptable and/or unacceptable answers. For instance, in some embodiments, the sender specifies an acceptable answer (e.g., "yes") that makes the message 108 viewable by an intended recipient or recipients. In other embodiments, the sender specifies an unacceptable answer (e.g., "no") that does not make the message 108 viewable by an intended recipient or recipients. In some embodiments, an intended recipient can view a list of both acceptable and unacceptable answers, and can select an answer from the list. In other embodiments, an intended recipient does not necessarily view acceptable and/or unacceptable answers to specified prompts 126, and generates a unique answer, which can then be compared to the acceptable and/or unacceptable answers to the specified prompts 126. It should be noted that a unique answer can be compared to acceptable and/or unacceptable answers to determine whether the answer is acceptable and/or unacceptable (e.g., "close enough").

In some embodiments, the sender uses the messaging module 120 to specify a condition 110 comprising an indication 128 that the sender will make a message 108 viewable by an intended recipient or recipients (e.g., at a future time). The messaging module 120 can then provide the specified indication 128 as one or more of the conditions 110 included with the electronic message package 106. In embodiments of the disclosure, the sender can also use the messaging module 120 to provide a teaser 130 for an intended recipient or recipients. As described herein, the term "teaser" can be used to describe message content that can be immediately viewable by an intended recipient or recipients (e.g., viewable upon receipt of the electronic message package 106 by the communication device 104, viewable before the message 108 is viewable on the communication device 104, viewable before one or more of the conditions 110 have been met, etc.). For example, a teaser 130 can hint at the content of the message 108. The teaser 130 can also be included as part of the electronic message package 106. In other embodiments, the sender uses the messaging module 120 to specify that the message 108 is to be kept secret from the intended recipient(s) unless or until delivery is initiated.

In embodiments of the disclosure, the sender uses the messaging module 120 to indicate one or more intended recipients 132 for a message 108. For instance, using the messaging module 120 on the communication device 102, the sender can indicate an intended recipient 132 by selecting a name (or multiple names) from a list (e.g., a list of contacts associated with the communication device 102). In other embodiments, the sender can indicate multiple intended recipients 132 by selecting a grouping of multiple contacts (e.g., using a message group). Once message 108, one or more conditions 110, possibly one or more teasers 130, and an indication or indications of one or more intended recipients 132 have been provided by the sender, message 108, condition(s) 110, possibly teaser(s) 130, and the indication(s) of intended recipient(s) 132 can be packaged in an electronic message package 106 (e.g., by the messaging module 120). The sender can then initiate sending of the electronic message package 106. For example, the messaging module 120 can be used by the sender to initiate sending of the electronic message package 106 via graphical indicia (e.g., a button), a voice command, a gesture, and so forth.

In embodiments of the disclosure, the electronic message package 106 is transmitted from the communication device 102 so that the message 108 is viewable on the communication device 104 when at least one condition 110 has been met. In some embodiments, a server 134 is communicatively coupled between a communication device 102 and one or more communication devices 104. The server 134 can be configured to transmit the message 108 to a communication device 104 when at least one condition 110 has been met. For example, the server 134 receives the message 108 with the electronic message package 106 transmitted from the communication device 102 and then transmits the message 108 to a communication device 104 associated with an intended recipient only when one or more of the conditions 110 provided with the electronic message package 106 has been met.

In some embodiments, the one or more conditions 110 are received at the server 134 where they are stored. For instance, the server 134 stores one or more of a location 122 where an intended recipient is to be, a time 124 when a message 108 is to be viewable by an intended recipient or recipients, a prompt 126 to be answered by an intended recipient or recipients, an indication 128 that a sender will make a message 108 viewable by an intended recipient or recipients, and so on. The server 134 can send a notification (e.g., a push notification) to notify the intended recipient(s) that an electronic message package 106 has been created. The notification can be sent to one or more communication devices 104 associated with one or more intended recipients. In some embodiments, the notification can comprise the teaser 130. In other embodiments, the intended recipient or intended recipients are not notified that the electronic message package 106 has been created (e.g., in the case of a secret message).

In embodiments of the disclosure, one or more communication devices 104 associated with an intended recipient or recipients can request information associated with the electronic message package 106 from the server 134 (e.g., upon receipt of the push notification). A communication device 104 can then be provided with information including, but not necessarily limited to: an identity of the sender (e.g., a username), an avatar for the sender (e.g., an image, a video, etc.), one or more conditions 110 for when the message 108 is to be viewable by an intended recipient or recipients, and so on. Based upon the one or more conditions 110, the communication device 104 may determine criteria for when the message 108 should be received. For example, the communication device 104 can determine a geofence, a time, and so on for receiving the message 108.

Using the communication device 104, an intended recipient can request to view information received from the server 134. For example, upon acknowledging the notification (e.g., the teaser 130), the communication device 104 can provide information regarding the electronic message package 106, such as an identity of the sender (e.g., the sender's username), an avatar for the sender, an indication of the one or more conditions 110 for when the message 108 is to be viewable by the intended recipient, possibly the teaser 130, and so forth. In some embodiments, acknowledgement of the indication can be provided by an intended recipient in the form of a gesture, such as a swipe, and information regarding the electronic message package 106 can be provided for the intended recipient in the form of a card view. However, a swipe and/or a card view are provided by way of example and are not meant to limit the present disclosure. In other embodiments, acknowledgement of a notification and/or information regarding the electronic message package 106 can be configured differently.

Once an indication is received that one or more conditions 110 have been met for an intended recipient, the message 108 is made viewable to the intended recipient. For example, when an intended recipient and/or a communication device 104 associated with the intended recipient arrives at a location 122 (e.g., within a sender-configured radius, such as a geofence), a notification (e.g., a push notification) is received stating that the message 108 can be viewed. In some embodiments, the communication device 104 monitors its position and alerts the server 134 that it has arrived at the location 122. The server 134 then pushes the message 108 to the communication device 104. In other embodiments, the message 108 is provided to the communication device 104 before the message 108 is viewable (e.g., with the electronic message package 106), and the communication device 104 makes the message viewable to the intended recipient once the communication device 104 has arrived at the location 122. In some embodiments, acknowledgement of receipt of the message 108 can be provided by an intended recipient in the form of a gesture, such as touching a card view. However, a card view is provided by way of example and is not meant to limit the present disclosure. In other embodiments, notifications and/or information regarding the message 108 can be configured differently.

In another example, when a time 124 arrives when a message 108 is to be viewable by an intended recipient or recipients, a notification (e.g., a push notification) is received stating that the message 108 can be viewed. In some embodiments, the server 134 monitors the time (e.g., checking every minute or at another time interval) and pushes the message 108 to the communication device 104 when a time 124 arrives. However, in other embodiments, the message 108 can be provided to the communication device 104 before the message 108 is to be viewable (e.g., with information associated with the electronic message package 106), and the communication device 104 can monitor the time and make the message viewable once a time 124 arrives when a message 108 is to be viewable by an intended recipient or recipients. As described, acknowledgement of receipt of the message 108 can be provided by an intended recipient in the form of a gesture, such as touching a card view.

In a further example, when a prompt 126 is acceptably answered by an intended recipient or recipients, a notification (e.g., a push notification) is received stating that the message 108 can be viewed. In some embodiments, the communication device 104 requests an answer to a prompt 126 and provides the answer to the server 134, which determines whether the answer is acceptable. The server 134 then pushes the message 108 to the communication device 104 when an acceptable answer is received. However, in other embodiments, the message 108 can be provided to the communication device 104 before the message 108 is to be viewable (e.g., with information associated with the electronic message package 106), and the communication device 104 can make the message viewable once an acceptable answer to the prompt 126 is provided by an intended recipient. In this example, acceptable and/or unacceptable answers to specified prompts 126 can be provided to the communication device 104 with the conditions 110 sent with the information associated with the electronic message package 106. As described, acknowledgement of receipt of the message 108 can be provided by an intended recipient in the form of a gesture, such as touching a card view.

In another example, when an indication 128 is triggered by the sender that makes the message 108 viewable by an intended recipient or recipients, a notification (e.g., a push notification) is received stating that the message 108 can be viewed. For example, the sender uses a gesture, such as the touch of a trigger button on the communication device 102, to make the message 108 viewable by an intended recipient. Then a notification (e.g., a push notification) is received stating that the message 108 can be viewed. In some embodiments, the server 134 pushes the message 108 to the communication device 104 upon triggering by the sender. However, in other embodiments, the message 108 can be provided to the communication device 104 before the message 108 is to be viewable (e.g., with information associated with the electronic message package 106), and the communication device 104 can make the message viewable once the communication device 104 receives confirmation that the sender has elected to make the message 108 viewable. As described, acknowledgement of receipt of the message 108 can be provided by an intended recipient in the form of a gesture, such as touching a card view.

It should be noted that while the server 134 has been described with some specificity as facilitating communication between the communication device 102 and one or more communication devices 104, this example is not meant to be restrictive of the present disclosure. In other embodiments, communication device 102 can communicate directly with one or more communication devices 104. For example, the communication device 102 can be configured to transmit the message 108 to a communication device 104 only when one or more conditions 110 provided with the electronic message package 106 has been met. The communication device 102 can also send a notification (e.g., the teaser 130) to notify the intended recipient(s) that an electronic message package 106 has been created. In embodiments of the disclosure, one or more communication devices 104 associated with an intended recipient or recipients can request information associated with the electronic message package 106 from the communication device 102 (e.g., upon receipt of the notification).

In one example, the communication device 104 monitors its position and alerts the communication device 102 that it has arrived at the location 122. The communication device 102 then sends the message 108 to the communication device 104. In another example, the communication device 102 monitors the time and sends the message 108 to the communication device 104 when a time 124 arrives. In a further example, the communication device 104 requests an answer to a prompt 126 and provides the answer to the communication device 102, which determines whether the answer is acceptable. The communication device 102 then sends the message 108 to the communication device 104 when an acceptable answer is received. In another example, the sender performs a triggering action at the communication device 102 to make the message 108 viewable by an intended recipient. In some embodiments, the communication device 102 sends the message 108 to the communication device 104 upon triggering by the sender.

In some embodiments, the system 100 is configured so that the server 134 manages accounts for senders and intended recipients associated with the communication devices 102 and 104. As described herein, an electronic message package 106 can be created for an intended recipient or recipients who do not necessarily have an account with the system 100 (e.g., a guest user or users). In some embodiments, content associated with the creation of an electronic message package 106 can still be provided for an intended recipient who does not have an account. For example, when a sender creates an electronic message package 106, the sender uses the messaging module 120 to indicate one or more intended recipients 132 for a message 108 (e.g., as previously described). In some embodiments, the messaging module 120 allows the sender to indicate an intended recipient 132 by specifying identifying information not necessarily associated with an account managed by the server 134, such as one or more telephone numbers associated with an intended recipient or recipients.

Then, the communication device 102 and/or the server 134 can send a text message (e.g., an SMS text message) with a hyperlink that an intended recipient can use to download a software application or "app" on a communication device 104 to establish an account with the system 100. For example, an intended recipient receives a text message stating, "Sender has created an electronic message package for you; to see the message, download the app here: www.url.com." The text message can also include authentication information, such as a confirmation code. However, downloading a software application is provided by way of example and is not meant to limit the present disclosure. In other embodiments, a software application can be native to the communication device 104. In further embodiments, the communication device 104 can be used to send a confirmation (e.g., on a communications network using, for instance, an SMS confirmation). In some embodiments, the sender can initiate sending of an SMS text message using the communication device 102. In other embodiments, the server 134 can initiate sending of an SMS text message. Once an intended recipient has created an account with the system 100 (e.g., by downloading a software application and installing it on a communication device 104 and then using the app to create an account, by creating an account using a native software application, by providing an SMS confirmation, etc.), the communication device 104 can receive information associated with the electronic message package 106 from the server 134 and/or from the communication device 102.

In some embodiments, the server 134 can store an electronic message package 106 associated with an intended recipient or recipients along with identifying information not necessarily associated with an account managed by the server 134, such as a telephone number. This information can be stored in a temporary user account created on the server 134 (e.g., if no user with that telephone number already exists in the system 100). Then, when an intended recipient creates a new user account using a telephone number associated with a temporary user account (and possibly authentication information to verify the telephone number, such as a confirmation code), the server 134 can search for any temporary user accounts associated with that telephone number. For example, an intended recipient creates an account with the system 100 using the telephone number at which the SMS text message was received. Then, any temporary user accounts associated with that telephone number can be assigned to the intended recipient's new account, and the temporary user accounts can be deleted by the server 134. It should be noted that in some embodiments, a sender must request that an intended recipient agree to receive information associated with an electronic message package 106 from the server 134 and/or from the communication device 102 (e.g., in the manner of a "friendship request").

Figure 5:
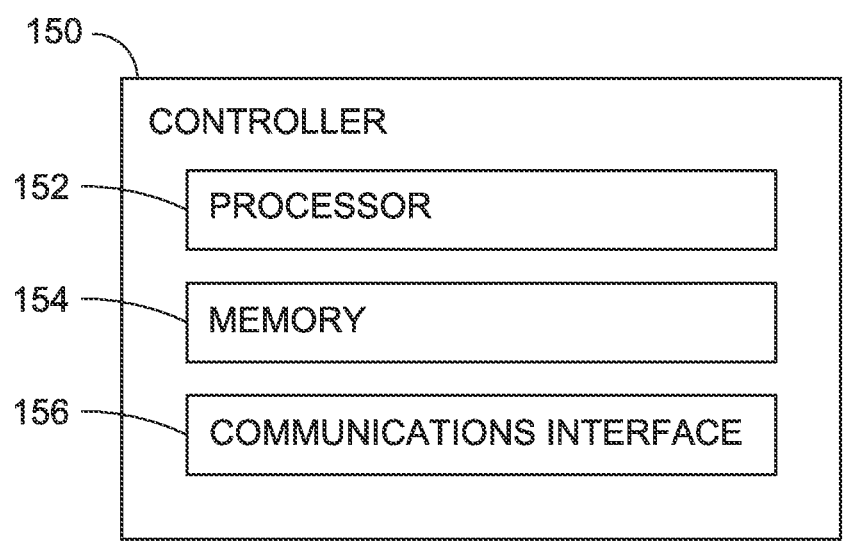
FIG. 5 is a block diagram illustrating a controller for an electronic messaging system, such as the electronic messaging system illustrated in FIG. 4, in accordance with example embodiments of the present disclosure.

Referring now to FIG. 5, a system 100, including some or all of its components, can operate under computer control. For example, a processor can be included with or in a system 100 to control the components and functions of systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

One or more of the communication devices 102, the communication devices 104, and/or the server 134 can be coupled with a controller 150 for controlling transmission and receipt of a message 108 for an intended recipient or recipients so that the message 108 is viewable by an intended recipient only when one or more conditions have been met. The controller 150 can include a processor 152, a memory 154, and a communications interface 156. The processor 152 provides processing functionality for the controller 150 and can include any number of processors, micro-controllers, or other processing systems, and resident or external memory for storing data and other information accessed or generated by the controller 150. The processor 152 can execute one or more software programs that implement techniques described herein. The processor 152 is not limited by the materials from which it is formed or the processing mechanisms employed therein and, as such, can be implemented via semiconductor(s) and/or transistors (e.g., using electronic integrated circuit (IC) components), and so forth.

The memory 154 is an example of tangible, computer-readable storage medium that provides storage functionality to store various data associated with operation of the controller 150, such as software programs and/or code segments, or other data to instruct the processor 152, and possibly other components of the controller 150, to perform the functionality described herein. Thus, the memory 154 can store data, such as a program of instructions for operating the system 100 (including its components), and so forth. It should be noted that while a single memory 154 is described, a wide variety of types and combinations of memory (e.g., tangible, non-transitory memory) can be employed. The memory 154 can be integral with the processor 152, can comprise stand-alone memory, or can be a combination of both.

The memory 154 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, one or more of the communication devices 102, the communication devices 104, and/or the memory 154 can include removable integrated circuit card (ICC) memory, such as memory provided by a subscriber identity module (SIM) card, a universal subscriber identity module (USIM) card, a universal integrated circuit card (UICC), and so on.

The communications interface 156 is operatively configured to communicate with components of the system 100. For example, the communications interface 156 can be configured to transmit data for storage in the system 100, retrieve data from storage in the system 100, and so forth. The communications interface 156 is also communicatively coupled with the processor 152 to facilitate data transfer between components of the system 100 and the processor 152 (e.g., for communicating inputs to the processor 152 received from a device communicatively coupled with the controller 150). It should be noted that while the communications interface 156 is described as a component of a controller 150, one or more components of the communications interface 156 can be implemented as external components communicatively coupled to the system 100 via a wired and/or wireless connection. The system 100 can also comprise and/or connect to one or more input/output (I/O) devices (e.g., via the communications interface 156), including, but not necessarily limited to: a display, a mouse, a touchpad, a keyboard, and so on.

The communications interface 156 and/or the processor 152 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example and is not meant to limit the present disclosure. Further, the communications interface 156 can be configured to communicate with a single network or multiple networks across different access points.

Example Process

The following discussion describes example techniques for transmitting a message for an intended recipient or recipients so that the message is viewable by an intended recipient only when one or more conditions have been met.

Figure 6A:
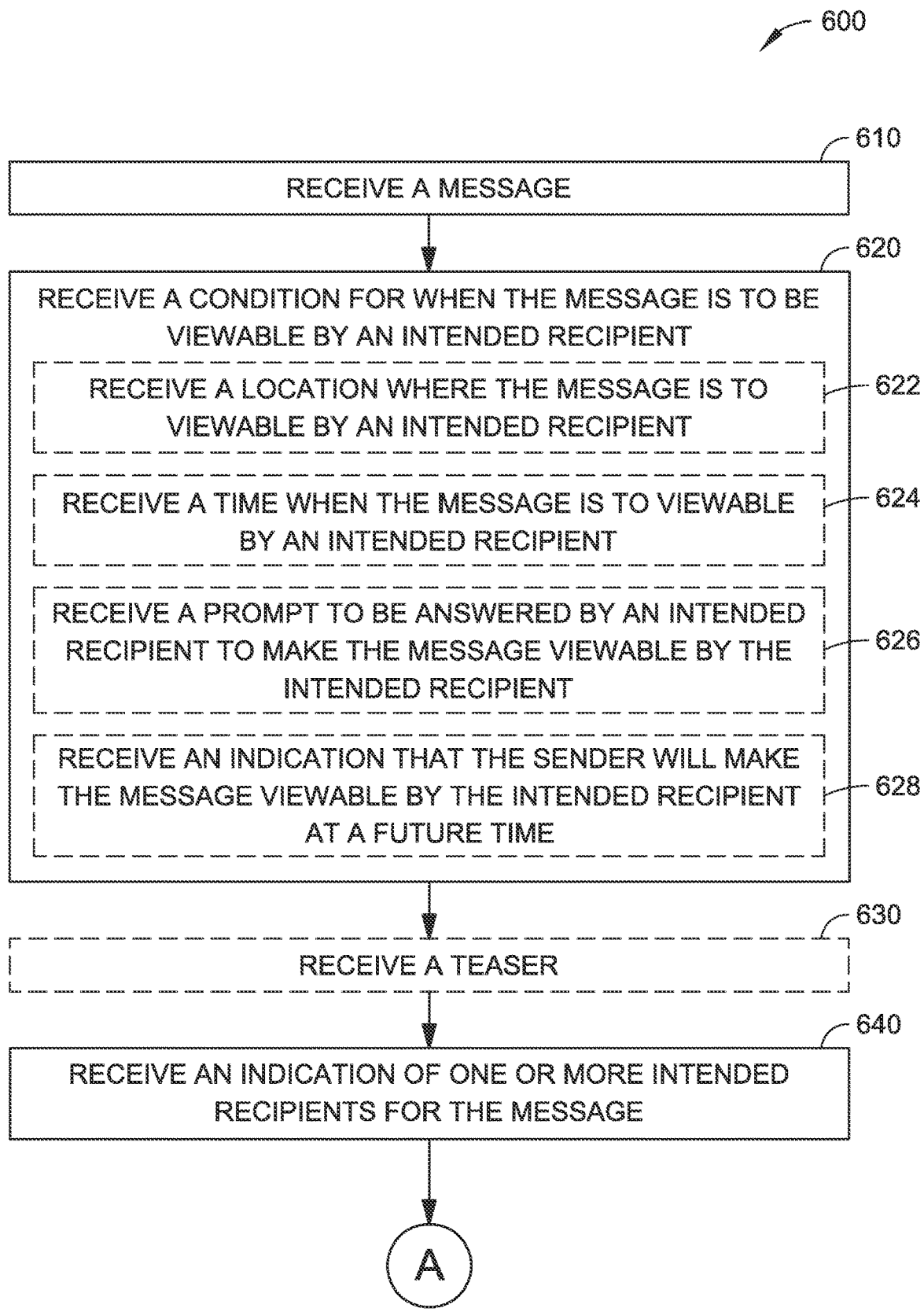
FIGS. 6A and 6B are a flow diagram illustrating a method for transmitting a message for an intended recipient or recipients so that the message is viewable by an intended recipient only when one or more conditions have been met in accordance with example embodiments of the present disclosure.
Figure 6B:
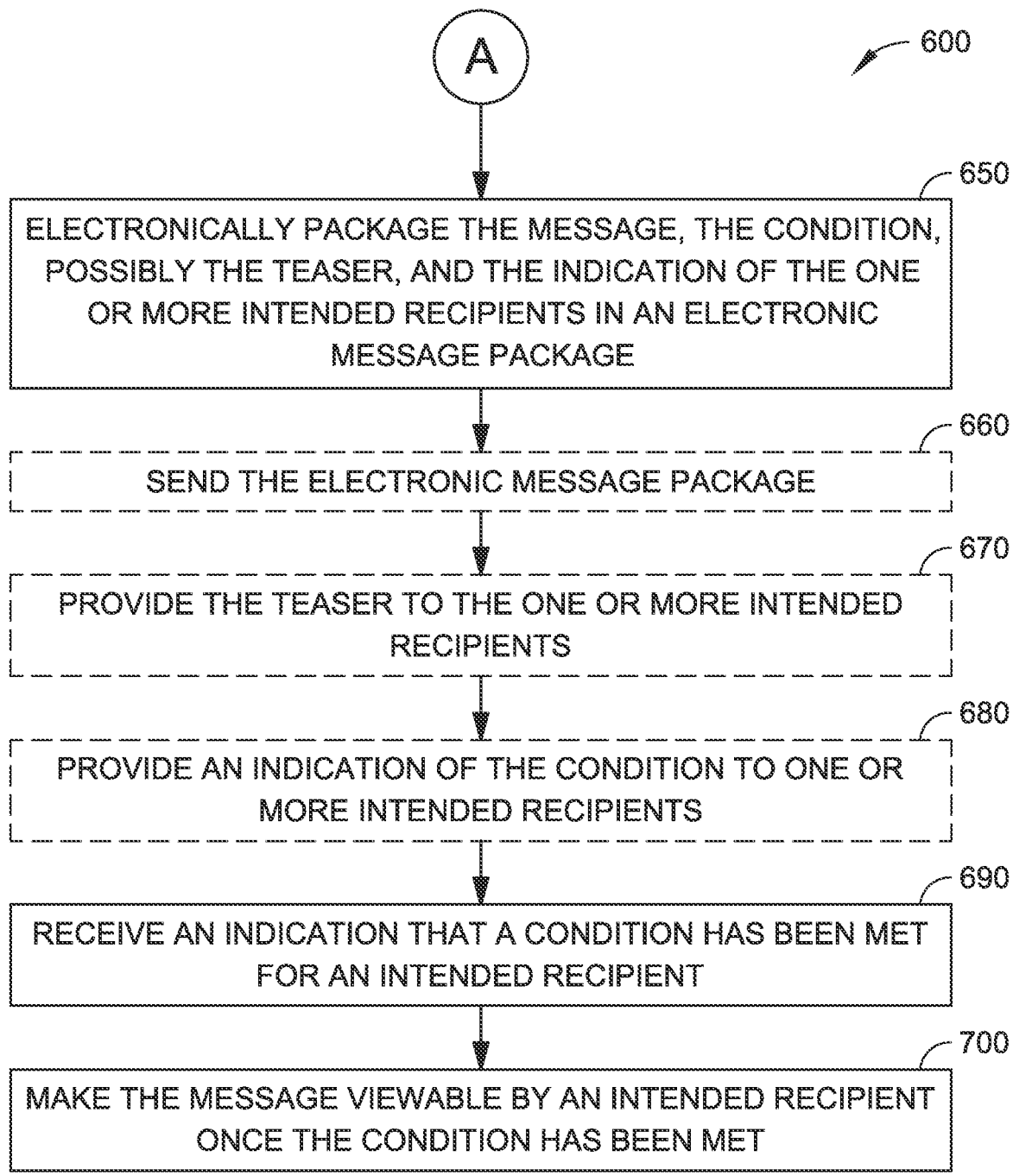

FIG. 6 depicts a procedure 600, in example embodiments, in which a message can be sent by a sender associated with a first communication device and made viewable on an intended recipient's communication device once a condition or set of conditions provided by the sender has been met. In the procedure 600 illustrated, a message is received (Block 610). For example, with reference to FIGS. 1 through 5, a sender creates a message 108, which can be a text message, an image, a video, a combination of text with image and/or video (e.g., a media rich message), and so forth (e.g., as previously described). In embodiments, of the disclosure, the message 108 is received by the communication device 102. For example, the sender composes the message 108 using the messaging module 120 on the communication device 102.

Next, one or more conditions are received for when the message is to be viewable by an intended recipient or recipients (Block 620). For instance, with continuing reference to FIGS. 1 through 5, one or more conditions 110 for when the message 108 is to be viewable by an intended recipient or recipients are specified using the messaging module 120 on the communication device 102. In some embodiments, a condition can be a location where the message is to be viewable by an intended recipient (Block 622). For example, with continuing reference to FIGS. 1 through 5, using the messaging module 120 on the communication device 102, the sender can specify a geographic location 122 or locations 122 where an intended recipient is to physically be for a message 108 to be viewable by the intended recipient (e.g., as previously described).

In some embodiments, a condition can be a time when the message is to be viewable by an intended recipient or recipients (Block 624). For instance, with continuing reference to FIGS. 1 through 5, using the messaging module 120 on the communication device 102, the sender can specify a time 124 or times 124 when a message 108 is to be viewable by an intended recipient or recipients (e.g., as previously described). In some embodiments, a condition can be a prompt to be answered by an intended recipient or recipients to make the message viewable by an intended recipient (Block 626). For example, with continuing reference to FIGS. 1 through 5, using the messaging module 120 on the communication device 102, the sender can enter a text phrase prompt 126 to direct an intended recipient or recipients to complete one or more tasks to make a message 108 viewable by an intended recipient (e.g., as previously described).

In some embodiments, a condition can be an indication that the sender will make the message viewable by an intended recipient or recipients at a future time (Block 628). For instance, with continuing reference to FIGS. 1 through 5, using the messaging module 120 on the communication device 102, the sender provides an indication 128 that a message 108 will be made viewable by the sender at a future time (e.g., sometime after the electronic message package 106 is sent). In some embodiments, one or more teasers can be received for an intended recipient or recipients (Block 630). For example, with continuing reference to FIGS. 1 through 5, using the messaging module 120 on the communication device 102, the sender provides a teaser 130 that can be immediately viewable by an intended recipient or recipients (e.g., on one or more communication devices 104 associated with the intended recipients).

Then, an indication of one or more intended recipients for the message is received (Block 640). For instance, with continuing reference to FIGS. 1 through 5, using the messaging module 120 on the communication device 102, the sender indicates an intended recipient 132 by selecting a name (or multiple names) from a list. Next, the message, one or more conditions, possibly one or more teasers, and the indication of one or more intended recipients are electronically packaged in an electronic message package (Block 650). For example, with continuing reference to FIGS. 1 through 5, once the message 108, the one or more conditions 110, possibly the one or more teasers 130, and an indication of the one or more intended recipients 132 have been provided by the sender, the message 108, the condition(s) 110, possibly the teaser(s) 130, and the indication of the intended recipients 132 can be packaged in an electronic message package 106. Then, in some embodiments, the electronic message package can be sent (Block 660). For instance, with continuing reference to FIGS. 1 through 5, the sender can use the messaging module 120 to initiate sending of the electronic message package 106 via a graphical interface, a voice command, a gesture, and so forth.

In some embodiments, the teaser is provided to the one or more recipients (Block 670). For example, with continuing reference to FIGS. 1 through 5, a notification (e.g., a push notification comprising the teaser 130) is provided via communication device(s) 104 to notify the intended recipient(s) that an electronic message package 106 has been created. In some embodiments, an indication of the condition is provided to one or more intended recipients (Block 680). For instance, with continuing reference to FIGS. 1 through 5, upon acknowledging the notification, the communication device 104 can provide information regarding the electronic message package 106 for an intended recipient, including an indication of one or more conditions 110 for when the message 108 is to be viewable by the intended recipient, and possibly the sender's username, the sender's avatar, and so forth.

Next, an indication that a condition has been met for an intended recipient is received (Block 690). For example, with continuing reference to FIGS. 1 through 5, the communication device 104 monitors its position and alerts the server 134 that it has arrived at a location 122 within a sender-configured radius, such as a geofence. In another example, the server 134 monitors the time to determine when a time 124 arrives. In a further example, the communication device 104 requests an answer to a prompt 126 and provides the answer to the server 134, which determines whether the answer is acceptable. In another example, the sender performs a triggering action at the communication device 102, to make the message 108 viewable by an intended recipient. An indication of the triggering action can be received at the server 134. Then, the message is made viewable by an intended recipient once the condition has been met (Block 700). For instance, with continuing reference to FIGS. 1 through 5, once an indication is received that one or more conditions 110 have been met for an intended recipient, the message 108 is made viewable to the intended recipient. For example, the server 134 pushes the message 108 to the communication device 104.

Figure 7:
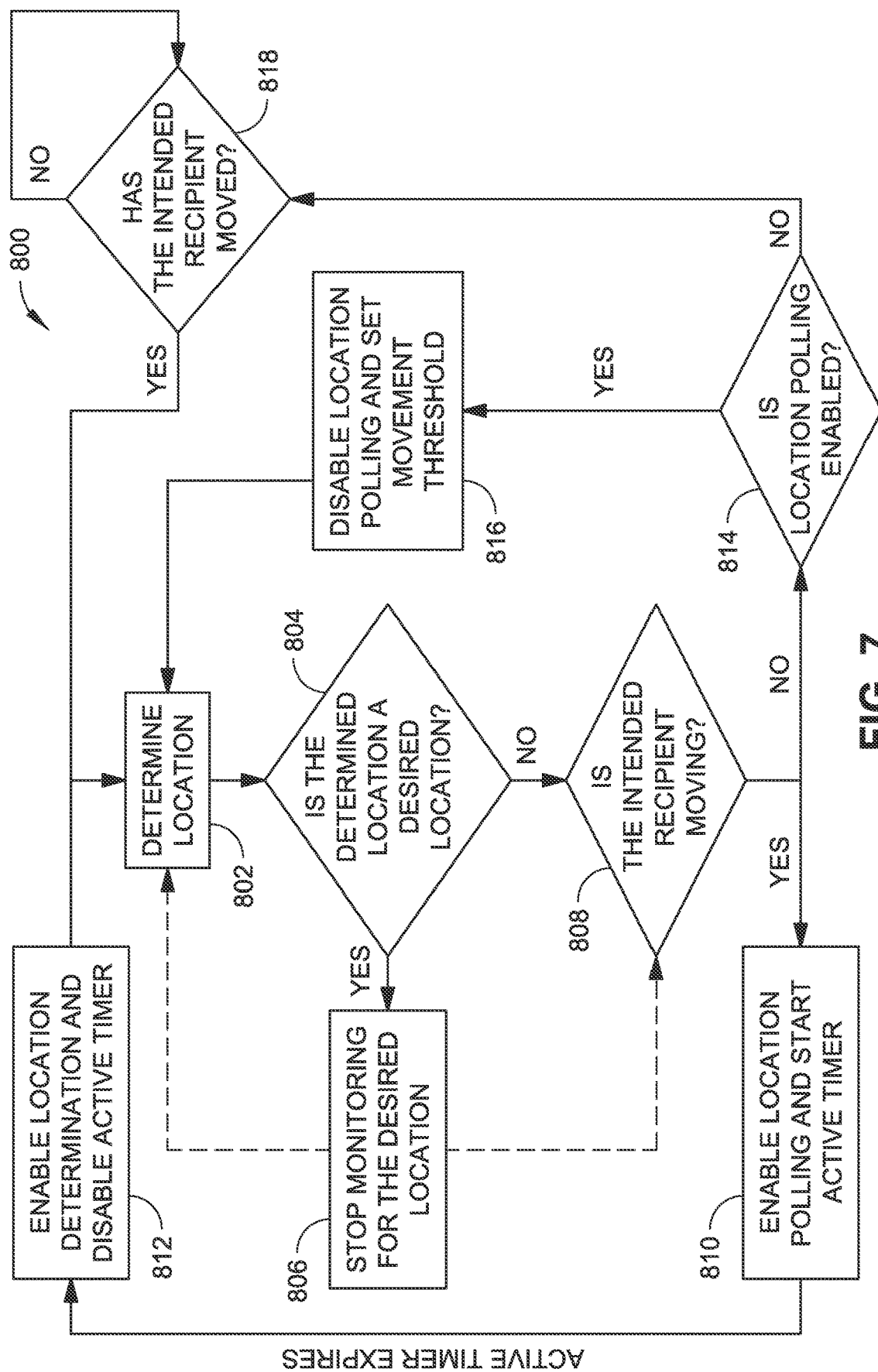
FIG. 7 is a flow diagram illustrating a method for operating a communication device to monitor its position in accordance with example embodiments of the present disclosure.

Referring now to FIG. 7, example techniques for operating a communication device to monitor its position are described. For example, with reference to FIGS. 1 through 5, communication device 104 monitors its position so that server 134 can be alerted that the communication device 104 has arrived at location 122, e.g., within a sender-configured radius, such as a geofence. FIG. 7 depicts a procedure 800, in example embodiments, in which a system can be configured to reduce power consumption by a communication device as the communication device is operated to monitor its position. In some embodiments, a communication device equipped with a GPS navigation system (or another navigation system that provides location and/or time information) may consume significantly more power (e.g., from a battery) when the GPS equipment is enabled and the device is moving. Thus, the communication device can be configured to selectively enable and disable the GPS equipment to conserve power. In embodiments of the disclosure, the communication device and/or the GPS system may use additional location and/or time information, including information obtained from WiFi and/or other local area wireless computer networking technology, e.g., to improve location accuracy.

In the procedure 800 illustrated, the location of the communication device is determined (Block 802). For instance, with reference to FIGS. 1 through 5, a GPS navigation system and/or local area wireless computer networking monitoring technology is used to determine a location of the communication device 104. Then, a determination is made as to whether the determined location is a desired location (Decision Block 804). For example, with continuing reference to FIGS. 1 through 5, it is determined that the communication device 104 associated with an intended recipient has arrived at the location 122. When the determined location is a desired location, the communication device may stop monitoring for the desired location (Block 806). For instance, with continuing reference to FIGS. 1 through 5, it is determined that a location condition 110 has been met for an intended recipient when the intended recipient and/or the communication device 104 associated with the intended recipient arrives at the location 122, and message 108 is made viewable to the intended recipient. The intended recipient may also receive a notification (e.g., a push notification) stating that the message 108 can be viewed. It should be noted that while the communication device 104 may stop monitoring for the location 122, it may continue to monitor for other locations (e.g., returning to Block 802, moving to Block 808, etc.). In other embodiments, the communication device 104 may stop monitoring its location for a time (e.g., until a message 108 with another location condition 110 is received).

When the determined location is not a desired location, a determination is made as to whether the intended recipient is moving (Decision Block 808). For example, with continuing reference to FIGS. 1 through 5, it is determined that the communication device 104 associated with the intended recipient is moving (e.g., by comparing a current GPS location to a previous GPS location most recently retrieved by the device and using a time difference between the two measurements to determine a speed and/or velocity, using measurements from an accelerometer in the communication device 104 to determine a speed and/or velocity, etc.). In some embodiments, movement of the intended recipient is determined using a speed threshold, which may be defined as a speed at or above which movement is indicated. In embodiments of the disclosure, a speed threshold can be provided to the communication device 104 by server 134, and may be updated by a server update.

When the intended recipient is moving, location polling is enabled and an active timer is started (Block 810). For instance, with continuing reference to FIGS. 1 through 5, the communication device 104 can enable location polling, disabling the GPS navigation system and/or additional location monitoring equipment for a predetermined period of time. A timer can be initiated to determine when the communication device 104 should enable the GPS equipment and/or additional location monitoring equipment to check its current location and/or take another action. The timer can be set for a predetermined time based upon the determined speed of the intended recipient. For example, the current GPS location can be stored (to be used for a later determination of movement), and the timer can be set based upon the time required to reach another location at the current speed of the intended recipient (or another speed). In some embodiments, the current speed of the intended recipient can be set to a minimum speed (e.g., provided to the communication device 104 by the server 134, updated by a server update, etc.). For instance, when the intended recipient's speed is less than seventy miles per hour (70 mph), a speed of seventy miles per hour (70 mph) can be used as the current speed of the intended recipient to calculate the time to the next location and set the timer accordingly. However, when the intended recipient's speed is greater than seventy miles per hour (70 mph), the intended recipient's determined speed can be used to calculate the time to the next location and set the timer accordingly.

Then, once the active timer has expired, location determination is enabled and the active timer is disabled (Block 812). For example, with continuing reference to FIGS. 1 through 5, the communication device 104 can enable the GPS navigation system and/or additional location monitoring equipment. Proceeding again through Blocks 802, 804, and 808, when the intended recipient is not moving, a determination is made as to whether location polling is enabled (Block 814). When location polling is enabled, location polling is disabled and a movement threshold is set (Block 816). For instance, with continuing reference to FIGS. 1 through 5, the communication device 104 can disable location polling functionality, enabling location monitoring by the GPS navigation system and/or additional location monitoring equipment. The current location can be stored (to be used for a later determination of movement), and a movement threshold, which may be defined as a distance from a location at or beyond which movement is indicated, can be set (e.g., provided to the communication device 104 by the server 134, updated by a server update, etc.).

Proceeding again through Blocks 802, 804, 808, and 814, when location polling is not enabled, a determination is made as to whether the intended recipient has moved (Block 818). For example, with continuing reference to FIGS. 1 through 5, the communication device 104 can use the GPS navigation system and/or additional location monitoring equipment to determine when the intended recipient has moved farther from the location stored at Block 816 than the movement threshold provided at Block 816. In some embodiments, when the communication device 104 is not moving while the GPS equipment is enabled, significantly less power (e.g., from a battery) may be consumed as compared to when GPS equipment is enabled while the device is moving. Thus, systems and techniques described herein can reduce power consumption by a communication device as the communication device is operated to monitor its position, while still allowing the communication device to determine when the intended recipient arrives at location 122, e.g., within a sender-configured radius, such as a geofence.

In some embodiments, when the intended recipient and/or the communication device 104 associated with the intended recipient leaves the location 122, the message 108 can be made unavailable to the intended recipient. For instance, the message 108 can be made viewable to the intended recipient following Block 804, but the process 800 may proceed to Block 808 (rather than to Block 806), and the communication device 104 may continue monitoring for the location 122. Proceeding again to Block 804, when the determined location is not a desired location, the communication device 104 can make the message 108 unavailable to the intended recipient. For example, when the location 122 is a geofence that bounds a retail store, the communication device 104 can make the message 108 viewable while the intended recipient is within the store, but then make the message 108 unavailable when the intended recipient leaves the store. The communication device 104 may continue to monitor its location, and, if the intended recipient is again within the retail store, the message 108 can again be made viewable to the intended recipient.

In some embodiments, a boundary and/or a buffer can be defined around a location 122, such as a geofence, within which the GPS navigation system and/or additional location monitoring equipment can always be enabled (e.g., regardless of whether the intended recipient is moving). In this manner, a more accurate time and/or location where a location condition 110 was met can be determined.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An electronic messaging system comprising:
a memory operable to store one or more modules; and
a processor operably coupled to the memory, the processor operable to execute the one or more modules to:
receive an electronic message package from a sender, the electronic message package comprising a secret message from the sender associated with a first communication device, an indication of at least one intended recipient, at least one condition for when the secret message is to be viewable by the at least one intended recipient, the at least one condition comprising at least one location condition specified by the sender, the at least one condition specifying where the at least one intended recipient is to be for the secret message to be viewable by the at least one intended recipient, and a teaser composed by the sender that is immediately viewable by the at least one intended recipient before the secret message is viewable, the teaser comprising a hint of the secret message that does not reveal the secret;

monitor, by a sensor, a location of the at least one intended recipient;

obtain, by the sensor, a first location of the at least one intended recipient and at least a second location of the at least one intended recipient;

determine at least one of a speed or a velocity of the at least one intended recipient based on the first location of the at least one intended recipient and the at least a second location of the at least one intended recipient;

determine that the at least one location condition has been met based on the location of the at least one intended recipient;

initiate delivery of the secret message at a second communication device so that the secret message is viewable by the at least one intended recipient only when the at least one condition has been met while the teaser is immediately viewable by the at least one intended recipient; and terminate monitoring of the location of the at least one intended recipient after the at least one location condition has been met.

2. The electronic messaging system as recited in claim 1, wherein the processor is operable to execute the one or more modules to:

determine a time difference between the first location of the at least one intended recipient and the at least a second location of the at least one intended recipient; and determine the at least one of a speed or a velocity of the at least one intended recipient based on the time difference.

3. The electronic messaging system as recited in claim 1, wherein the at least one condition further comprises a time when the secret message is to be viewable by the at least one intended recipient.

4. The electronic messaging system as recited in claim 1, wherein the at least one condition further comprises a countdown time after which the secret message is to be viewable by the at least one intended recipient.

5. The electronic messaging system as recited in claim 1, wherein the at least one condition further comprises a prompt to be answered by the at least one intended recipient to make the secret message viewable by the at least one intended recipient.

6. The electronic messaging system as recited in claim 1, wherein the at least one condition further comprises an indication that the sender will make the secret message viewable by the at least one intended recipient.

7. The electronic messaging system as recited in claim 1, wherein the teaser comprises text.

8. The electronic messaging system as recited in claim 1, wherein the teaser comprises an image.

9. A computer-implemented method for transmitting a secret message for an intended recipient so that the secret message is viewable by the intended recipient only when at least one condition has been met, the computer-implemented method comprising:

receiving, by a processor, a secret message from a sender associated with a first communication device;

receiving, by the processor, an indication of at least one intended recipient;

receiving, by the processor, at least one condition specified by the sender, the at least one condition for when the secret message is to be viewable by the at least one intended recipient, the at least one condition comprising at least one location condition where the at least one intended recipient is to be for the secret message to be viewable by the at least one intended recipient;

receiving, by the processor, a teaser composed by the sender that is immediately viewable by the at least one intended recipient before the secret message is viewable, the teaser comprising a hint of the secret message that does not reveal the secret;

causing the processor to make the teaser immediately viewable by the at least one intended recipient;

monitoring, by a sensor, a location of the at least one intended recipient;

obtaining, by the sensor, a first location of the at least one intended recipient and at least a second location of the at least one intended recipient;

determining, by the processor, at least one of a speed or a velocity of the at least one intended recipient based on the first location of the at least one intended recipient and the at least a second location of the at least one intended recipient;

determining, by the processor, that the at least one location condition has been met based on the location of the at least one intended recipient;

causing the processor to make the secret message viewable by the at least one intended recipient only when the at least one condition has been met; and causing the processor to terminate monitoring of the location of the at least one intended recipient after the at least one location condition has been met.

10. The computer-implemented method as recited in claim 9, further comprising determining, by the processor, whether the at least one intended recipient is moving.

11. The computer-implemented method as recited in claim 9, wherein determining whether the at least one intended recipient is moving includes:

determining a time difference between the first location of the at least one intended recipient and the at least a second location of the at least one intended recipient; and determining the at least one of a speed or a velocity of the at least one intended recipient based on the time difference.

12. The computer-implemented method as recited in claim 9, wherein the at least one condition further comprises a countdown time after which the secret message is to be viewable by the at least one intended recipient.

13. The computer-implemented method as recited in claim 9, wherein the at least one condition further comprises a prompt to be answered by the at least one intended recipient to make the secret message viewable by the at least one intended recipient.

14. The computer-implemented method as recited in claim 9, wherein the at least one condition further comprises an indication that the sender will make the secret message viewable by the at least one intended recipient.

15. The computer-implemented method as recited in claim 9, wherein the teaser comprises text.

16. The computer-implemented method as recited in claim 9, wherein the teaser comprises an image.

* * * * *